(12) United States Patent
Nakagawa et al.

(10) Patent No.: US 7,313,503 B2
(45) Date of Patent: Dec. 25, 2007

(54) DESIGNING LAYOUT FOR INTERNET DATACENTER COOLING

(75) Inventors: Osamu Samuel Nakagawa, Redwood City, CA (US); Cullen Bash, San Francisco, CA (US); Chandrakant Patel, Fremont, CA (US); Abdlmonem Beitelmal, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1159 days.

(21) Appl. No.: 10/076,635

(22) Filed: Feb. 19, 2002

(65) Prior Publication Data

US 2003/0158718 A1 Aug. 21, 2003

(51) Int. Cl.
G06F 17/50 (2006.01)
G06F 17/10 (2006.01)
F25D 11/02 (2006.01)

(52) U.S. Cl. .................. 703/1; 703/2; 62/441
(58) Field of Classification Search .............. 703/2, 703/1; 62/441
See application file for complete search history.

(56) References Cited

U.S. PATENT DOCUMENTS 4,989,417 A * 2/1991 Markiewicz ................ 62/441

2003/0115024 A1 * 6/2003 Snevely ..................... 703/1

OTHER PUBLICATIONS

Hayama et al., H. Airflow Distribution in Telecommunications Equipment Rooms, IEEE, 12th International Telecommunications Energy Conference, Oct. 1990, pp. 206-212.*
Kang et al., S. A Methodology for the Design of Perforated Tiles in Raised Floor Data Centers Using Computational Flow Analysis, 7th Intersociety Conf. on Thermal and Thermomechanical Phenomena in Electronic Systems, May 2000, pp. 215-224.*
Stahl et al., L. Designing an Alternative to Conventional Room Cooling, IEEE, 23rd Telecommunications Energy Conference, Oct. 2001, pp. 109-115.*
Kang et al., S. A Methodology for the Design of Perforated Tiles in Raised Floor Data Centers Using Computational Flow Analysis, IEEE Transactions on Components and Packaging Technologies, vol. 24, No. 2, Jun. 2001, pp. 177-183.*
Bannon, J.M. Accommodating Data, Consulting-Specifying Engineer, Jul. 2000, pp. 40-44.*
Patel et al., C.D. Thermal Considerations in Cooling Large Scale High Compute Density Data Centers, The Eight Intersociety Conference on Thermal and Thermpmechanical Phenomena in Electronic Systems, 2002, pp. 1-10.*

* cited by examiner

*Primary Examiner*—Russell Frejd

(57) ABSTRACT

A system and method to model and design a layout of an Internet Datacenter (IDC) for cooling. The IDC is defined as a collection of cells, the cells of the IDC are pre-characterized, an arrangement of the cells within the IDC is determined, and a profile for one or more parameters of interest for each cell are determined.

39 Claims, 5 Drawing Sheets

DESIGNING LAYOUT FOR INTERNET DATACENTER COOLING

FIELD OF THE INVENTION

This invention relates generally to cooling datacenters. More particularly, the invention relates to a computer-aided layout design framework for datacenter cooling.

BACKGROUND OF THE INVENTION

In Internet datacenters (IDC), heat generated by equipment such as computers need to be removed so that the equipment may operate properly. In a typical IDC, a centralized source provides the cooling air. The cooling air is distributed by fans, false floors, and the like to the equipment including servers, storage devices, power supply units, and the like.

Conventionally, the practice of designing a cooling system for an IDC is to perform a simple energy balance and to employ some "rule of thumb" approach. Energy balance requires a calculation of the expected heat generation and using the calculation to specify the capacity of the cooling system. Then, rule of thumb approaches are used to actually lay out the IDC including placements of the equipment, vent distribution for the cooling air, exhaust, redundancy, and the like. In the conventional design approach, temperature and velocity gradients (differences in heat generation, dissipation, cooling air delivery, and the like) are accounted for by designing in excess cooling capacity (a brute force approach).

However, the amount of heat generated by equipment has been steadily increasing. For example, in 1992, an average heat load per machine area in servers was between 200–300 watts per square foot (W/ft$^2$). The heat load is expected to exceed 2,500 W/ft$^2$ in a relatively short period of time. The conventional brute force approach to IDC cooling layout design will be insufficient in the future, and will be prohibitively expensive.

Computational large-scale modeling methods are available to model the behavior of a layout design for the IDC. However, to analyze the layout with the large-scale modeling, an extensive numerical simulation is performed that involves solving non-linear equations. Such a simulation take a very long time to run. For example, a simulation of an IDC with 32,000 square feet may take over 18 hours. To optimize the layout for efficient cooling, multiple simulations are required. However, because each simulation takes a long time to run, optimization using large-scale modeling is prohibitively expensive.

However, a lack of cooling optimization leads to wasted energy, which directly translates into higher operation and maintenance costs. In addition, without optimization, it is difficult, if not impossible, to plan for disaster situation such as a failure of some global air-conditioner, for example.

SUMMARY OF THE INVENTION

In an embodiment of the present invention, a method to design a layout for an IDC cooling includes defining the IDC as a collection of cells. The method also includes pre-characterizing the cells of the IDC. The method further includes determining an arrangement of the cells within the IDC. The method yet further includes determining a profile for one or more parameters of interest for each cell.

In another embodiment of the present invention, a system capable of designing a layout for an IDC cooling includes a definition module configured to define the IDC as a collection of cells. The system also includes a pre-characterization module configured to pre-characterize the cells of the IDC. The system further includes an arrangement module configured to determine an arrangement of the cells within the IDC. The system yet further includes a profiler module configured to determine a profile for one or more parameters of interest for each cell.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the principles of the present invention are described by referring mainly to an exemplary embodiments thereof. However, it should be understood that the same principles are equally applicable to and may be implemented in any system that may require design of layout for environmental control such as cooling, and that any such variation does not depart from the true spirit and scope of the present invention.

Moreover, in the following detailed description, references are made to the accompanying figures, which illustrate specific embodiments in which the present invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

According to an embodiment of the present invention, a cell-based modeling method may be utilized to design a layout of for efficient cooling of equipment, where the layout includes equipments and their placements in a building structure. An example of such building structure is an Internet datacenter (or IDC). The cell-based modeling method may provide a reduction in time in the convergence of a solution. The cell-based modeling may also provide a substantially accurate solution based on a given set of constraints. Thus, when cell-based modeling is used to design a layout of equipments for cooling, accuratesolutions may be determined quickly and optimized with less cost.

Figure 1:
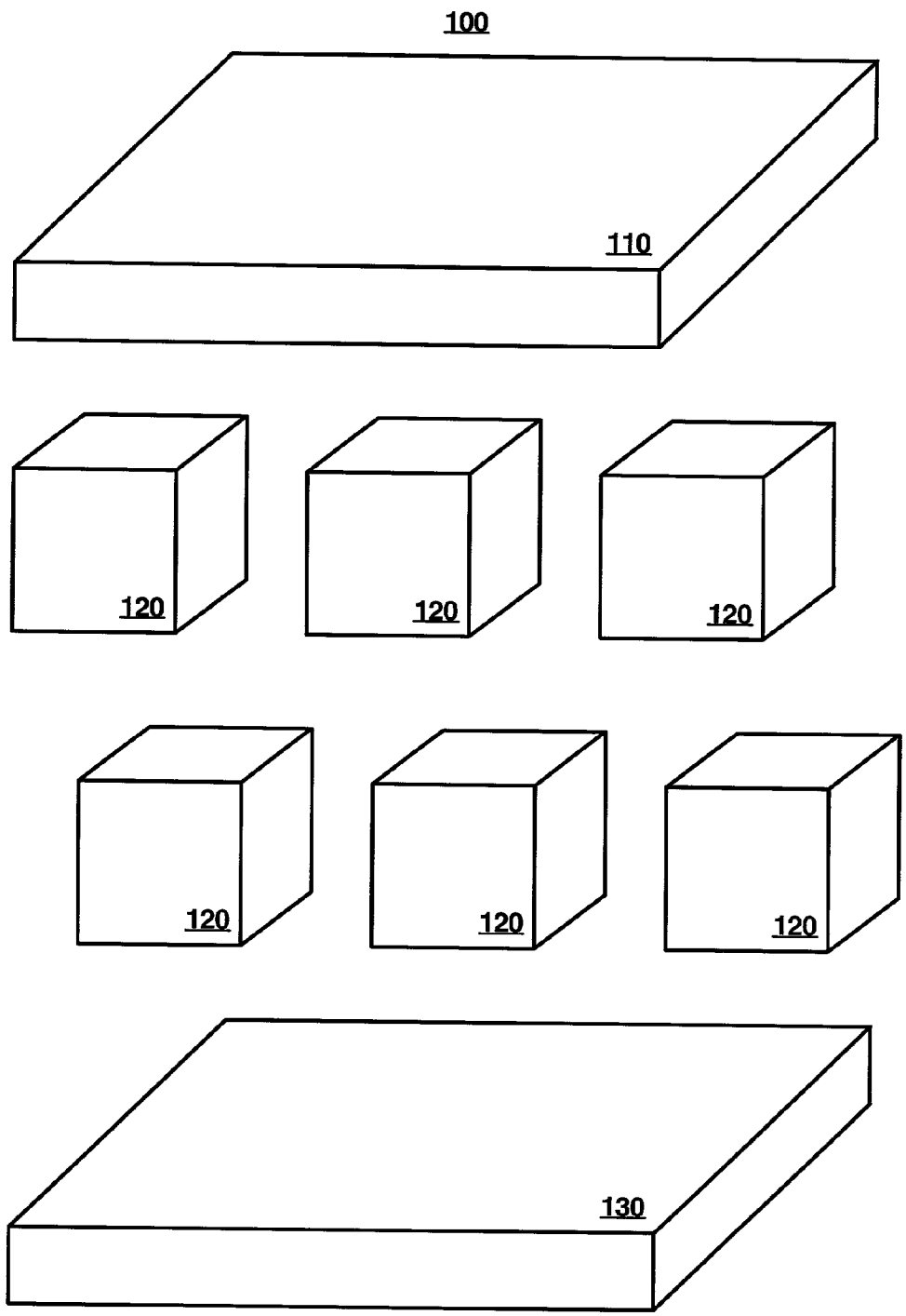
FIG. 1 illustrates an exemplary cell-based modeling of a datacenter according to an embodiment of the present invention.

In cell-based modeling, a selected layout may be decomposed into cells, where the cells are used to define certain characteristics. For example, a cell may be a cluster of racks, air conditioning units, ceiling, subfloor, and the like. The cells may be either global or local. FIG. 1 illustrates an exemplary cell-based modeling of an IDC 100 according to an embodiment of the present invention. As shown in FIG. 1, the IDC 100 may include a ceiling 110 (a global cell), one or more local cells 120 (racks, air conditioning, etc.), and a subfloor 130 (also a global cell).

A local cell may be defined as a cell where interactions with distant cells are disregarded. The effect on a local cell from a distant cell is likely to be much less significant than the effect from a neighboring cell. For example, a server at one end of an IDC room will be more affected by another server that immediately adjacent than by a router at the other end of the IDC room. Thus the effects of distant cells may be disregarded without a significant reduction in accuracy for the local cells.

However, in global cells, the long-range interactions from all cells are considered including interactions from distant cellsthat are disregarded by the local cells. This is because while the individual effect of one local cell may be insignificant, the cumulative effects of the cells may be significant. An example of global cells include ceiling and subfloors.

Regarding local cells, each local cell may have one or more parameters of interest. For example, a maximum temperature $\Phi$ within the local cell may be a particular parameter of interest. Other parameters of interest may include noise, electromagnetic interference, cost, air flow rate, humidity, and the like. Also, one or more variables may be associated with each cell, which have effect on the parameter(s) of interest. For example, a variable associated with the ceiling cell may be a ceiling plenum (CP). Similarly, a floor plenum (FP) may be a variable associated with the subfloor. Examples of other variables associated with local cells include server type (ST), vent tile pitch (VP), racks layout (RL), air conditioning (AC), and the like.

Cells, both local and global, may also include one or more cost attributes. Examples of cost attributes include power consumption, system cost, maintenance cost, AC performance limitation, and the like. The cost attributes may be used to calculate costs for optimization purposes. The costs may be in terms of dollars, power consumption, server density, usability, efficiency, and the like. Note that the choice of variables may affect the cost. For example, a choice of a powerful server system will likely result higher cost of cooling.

Figure 2:
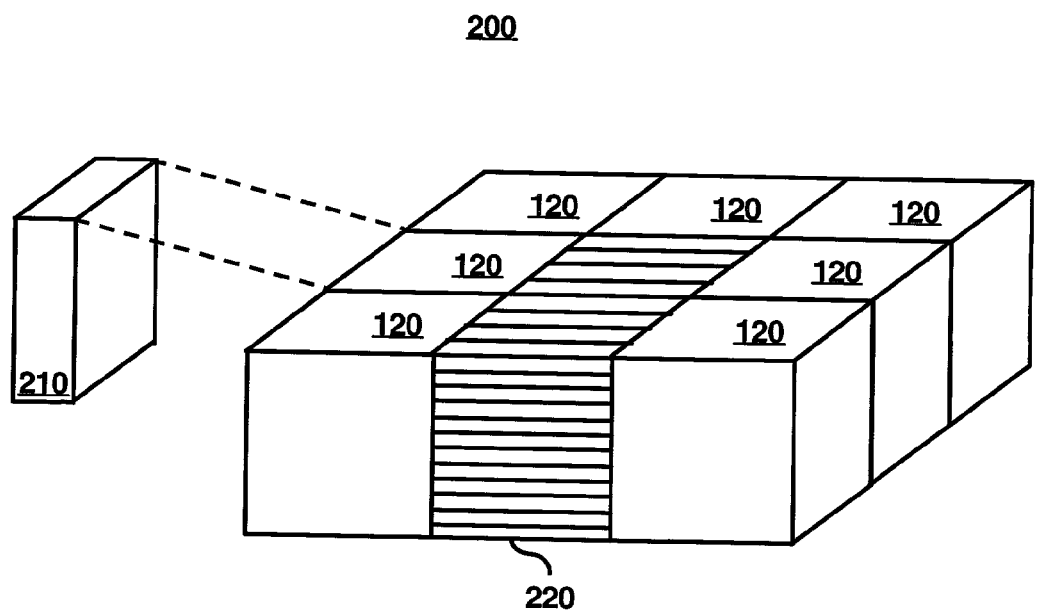
FIG. 2 illustrates exemplary cells including special cells according to an embodiment of the present invention.

In the cell-based modeling approach, special cells may be defined. FIG. 2 illustrates exemplary cells including special cells according to an embodiment of the present invention. As shown in FIG. 2, an arrangement of cells 200 may include a plurality of local cells 120, an edge cell 210, and a block cell 220. The edge cell 210 may include an attribute for air conditioner power, and the block cell 220 may define a region of space where no equipment is to be placed. In other words, the special cells may set specific boundary conditions in the IDC layout design process.

Figure 3:
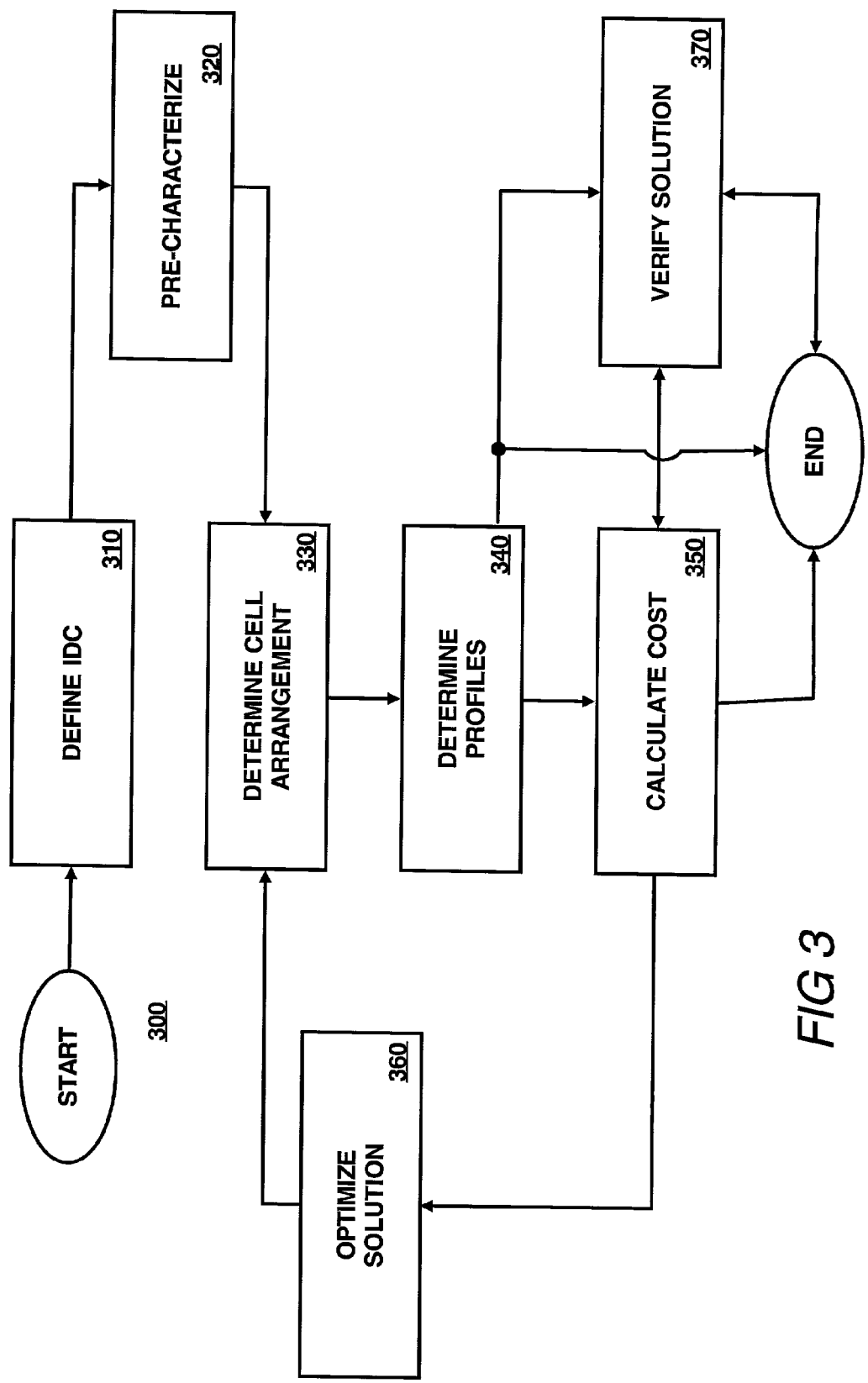
FIG. 3 illustrates a flow diagram of a cell-based modeling method to design a layout of a datacenter according to an embodiment of the present invention.

FIG. 3 illustrates an exemplary flow diagram 300 for a cell-based modeling method to design a layout of a datacenter according to an embodiment of the present invention. For the remainder of this discussion, the maximum temperature $\Phi$ will be used as a primary example of the parameter of interest. However, it should be understood that the other parameters may be the basis for the cell-based modeling.

The method 300 may include defining the IDC as a collection of cells (step 310), pre-characterizing the cells of the IDC (step 320), determining an arrangement of the cells within the IDC (step 330), and determining a profile of one or more parameters of interest (step 340). If the profile meets a predetermined criteria, then the method 300 may end. In other words, the layout design arrived in step 330 may be "satisfactory".

On the other hand, the layout design may not be satisfactory. Even if the design is satisfactory, more optimal solutions may still exist. These more optimal solutions may be searched by iterating with a different layout design. Towards this end, the method 300 may additionally include calculating costs of the layout design based on the profiles (step 350) reached in step 340, optimizing the solutions to find alternative cell arrangements (step 360), and iterating back to determining cell arrangement (step 330) and determining profiles (step 340).

After one or more iterations, the resulting layout design may be "sufficient". At this point, the method 300 may end. Alternatively, cost of the resulting layout design may be calculated (step 350) and/or the resulting layout may be verified (step 370) before ending. The steps of the method 300 are described in further detail hereinbelow.

In step 310, the initial IDC may be defined as a collection of cells. The cells may be finely defined (e.g. each individual computer equipment is a cell) or may be coarsely defined (e.g. all equipment together defined as one cell). The actual cell definitions (cell sizes) will fall somewhere in between. As will be discussed below, larger cell the cell size, the interactions between the cells becomes less significant, but increases the complexity of individual cells. Conversely, smaller the cell size, individual cell description is simplified, but the interactions among the cells become significant.

In one embodiment of the invention, it is preferred that effects of interactions between the cells be minimal so that disregarding the interactions will not significantly affect accuracy. It is also preferred to minimize the complexity of the cells to simplify the simulation and analysis. Thus the cell sizes chosen represent a compromise between these two preferences.

Also in step 310, cell characteristics and constraints may also be defined for the cells. The characteristics include server types, vent tile pitch, orientation, ceiling plenum, floor plenum, air conditioning, and the like. Constraints include placement constraints, upgrade restraints, cell dependencies, and the like may. For example, due to the high heat generation, a rack of servers may require a certain clearance distance from another equipment to ensure sufficient air flow, which may be accomplished through defining special cells 210.

In step 320, the cells of the IDC may be pre-characterized, for example by generating one or more look-up tables of coefficients for the parameter(s) of interest, such as cell temperature coefficients. Typically, the pre-characterization is performed once. The look-up table may be defined as a table of impacts of a neighboring cell and of variables within a cell to the parameter(s) of interest of the cell. The look-up table may be used to determine the profile(s) of the parameter(s) of interest for each cell in the IDC (described further below). In one embodiment, the look-up table may be generated from actual measurements of various cell combinations.

In another embodiment, the look-up table may be generated by pre-simulating various cell combinations using computational flow dynamics ("CFD"), which is a numerical simulation of flow dynamics. Normally, a full IDC layout design is complex. Accordingly, a CFD simulation of the full IDC may require a significant amount of time to complete. However, during the pre-characterization, simulations are performed only over a small area (e.g. 9~16 blocks of cells) and for simple cases. Accordingly, the CFD simulation time for pre-characterization may be relatively short.

Table I below depicts exemplary characteristics (or variables) for a cell. These variables for a center cell and a neighboring cell are tabulated along with the simulation results to form a look-up table, such as shown in Table II.

TABLE I exemplary variables

| ST (Server Type, Computing Power) | VP (Vent Tile Pitch) | RL (Rack Layout) | CP (Ceiling plenum) | FP (Floor plenum) | AC (Air Conditioning) |
|---|---|---|---|---|---|
| J | 0.7 tiles/ft, 1 tile/row | Front to back | 48 inches | 12 inches | Position 1 |
| K | 0.7 tiles/ft, 2 tiles/row | Back to back | 72 inches | 24 inches | Position 2 |

TABLE II look-up table

| Center Cell | | | | | | Neighboring Cell | | | | | | Temp | |
|---|---|---|---|---|---|---|---|---|---|---|---|---|---|
| ST | VP | RL | CP | FP | AC | ST | VP | RL | CP | FP | AC | Code | Coeff. |
| J | 1 | F | 48 | 12 | 1 | J | 1 | F | 48 | 12 | 2 | 1 | 8 |
| J | 1 | F | 48 | 12 | 1 | K | 2 | F | 48 | 12 | 2 | 2 | 9 |
| J | 1 | F | 48 | 12 | 1 | J | 3 | F | 48 | 12 | 2 | 3 | 11 |
| K | 1 | F | 48 | 12 | 1 | J | 1 | F | 48 | 12 | 2 | 1 | 12 |

Alternative to generating the full look-up table, a fitting formula may be generated to pre-characterize the cells. In other words, the fitting formula may be used to determine the profile of the parameter(s) of interest. The fitting formula may be considered as a reduced look-up table supplemented with interpolation. For example, instead of generating a full look-up table of coefficients of the parameter(s) of interest, a partial table may be generated instead. To determine the coefficients of the parameter(s) not listed in the partial table, an interpolation formula may be utilized. An advantage of the fitting formula approach is that less memory is required when compared to the full look-up table.

As noted above, the pre-characterizing step 320 may consider the impacts of adjacent cells in determining the temperature or other parameters of interest of the particular cell. In one embodiment, the impacts of the adjacent cells may be accounted for in the generation of the look-up tables and/or the fitting formula. In another embodiment, the impact of the adjacent cells may be extracted separately.

In step 330, an arrangement of cells may be determined. For example, a cell A (such as an Internet server or group of servers) may be placed adjacent to a cell B (such as a group of routers, bridges, disks). In another example, a cell C may be surrounded by a group of cells D. In a third example, a particular cell C may be surrounded by other cells C (the same type). The arrangement and the types of the cells affect the parameter of interest, such as the maximum temperature $\Phi$, of each cell due to the interaction with neighboring cells as described below. In arranging the cell placements, constraints and dependencies specified in step 310 above should be adhered to.

In step 340, one or more profiles of the parameter(s) of interest, such as the maximum temperature $\Phi$, of the cells are determined. In this step, the coefficient values from the aforementioned look-up table (Table II) or from the fitting formula, may be used in a multiple regression analysis to determine the profile. If the maximum temperature $\Phi$ of the cell is the parameter of interest, a multiple regression equation may be represented as:

$$\Phi = a_0 + a_1 s + a_2 s^2 + \ldots b_1 t + b_2 t^2 + \ldots c_1 u + c_2 u^2 + \ldots + d_1 v + d_2 v^2 + \ldots + e_1 w + e_2 w^2 + \ldots f_1 x + f_2 x^2 + \ldots + g_1 st + g_2 su + g_3 sv + g_4 sw + \quad (1)$$

where "s", "t", "u", "v", "w", "x" represent coded numbers (1, 2, 3, . . . ) for a set of cell variables; $a_0$, $a_1$ . . . $g_1$, $g_2$ . . . represent temperature coefficients from Table II ($a_0$ is for the center cell, $a_1$–$d_1$ are for the four surrounding cells, and $g_1$ and $f_1$ are for the global cells in the example used); and "st", "su", . . . represent the cell interaction terms. Equation 1 indicates that the temperature of the cell may be linearly dependent on its own characteristics, characteristics of the adjacent cells, as well as the interaction of the cells.

For simplicity, it may be desirable to drop the interaction terms ($g_1 st + g_2 su + g_3 sv + g_4 sw + \ldots$) and the higher-order terms ($a_2 s^2$, $b_2 t^2$, . . . ). To drop the interactions terms without significantly impacting the accuracy of the analysis, the cell size should be large enough so that the interaction between the cells is negligible. As mentioned above, the choice of the cell size is one of the important factors. A cell size may be related to a correlation coefficient $\sigma$, which is to be distinguished from the coefficients of the parameter(s) of interest in the look-up table. Wherein the coefficients of the parameter(s) of interest, such as the temperature coefficients in Table II, are used to predict the profile of the parameter in certain cell arrangement, the correlation coefficient $\sigma$ is used to gauge how closely that prediction matches the actual profile. The correlation coefficient $\sigma$ may be seen as an estimation of how accurately the multiple regression equation can reproduce the real result—higher the coefficient, more accurate the result. Thus, in order to be able to drop the interaction terms of equation 1, the cell size with a reasonable correlation coefficient $\sigma$ should be found.

It is reasonable to expect that a large cell size will improve $\sigma$. However, as the size of the cell increases, the number of codes (or cell variables) required to describe the large cell also correspondingly increases, i.e. the complexity of the cell increases. For large cells, the simulation combination may be relatively difficult.

After step 340 is completed, the temperature profile (or profiles of other parameters of interest) are determined. At this point, the IDC layout design may be deemed "satisfactory". In other words, the profiles may indicate that the calculated maximum temperature of the cells are below the maximum allowed operating temperature. For example, the calculated temperature for a server cell may be 100 degrees Fahrenheit and the maximum temperature allowed is 120 degrees. In another example, a router cell's calculated temperature is 90 degrees and the maximum allowed temperature for this router is 105 degrees. If the profiles are satisfactory, then the IDC design process may end after the step 340 as shown in FIG. 3.

Optionally, in step 350, the cost of the solution may be calculated for the layout design determined after step 340. As indicated hereinabove, the cost may be in terms of dollars, power consumption, server density, usability, efficiency, and the like.

Also optionally, in step 370, the solution arrived in after step 340 may be verified. For example, a full CFD simulation may be utilized to verify the solution. As mentioned above, CFD simulation of a full IDC layout design can be time-consuming. However, since this may be used only to verify the solution, it may be performed sparingly. Accordingly, the penalty is not severe.

However, after step 340, the layout design solution may not be satisfactory. Even if the solution is satisfactory, better solutions may still exist. The method 300 may iterate to find more optimal layout design solutions. As part of this effort to find better layout designs, the solution is "optimized" in step 360. In one embodiment, searches are conducted during the optimization step 360 to find alternate cell arrangements. One such search method is the genetic algorithm. The genetic algorithm is desirable because it determines the "best-thus-far" solutions. Other search algorithms include simulated annealing algorithm, threshold acceptance algorithm, branch and bound algorithm, gradient-descent algorithm, and the like. The list of optimizing search methods provided is not exhaustive.

The results of the optimization step 360 may used to determine cell arrangements for subsequent iteration (see step 330) and the profile(s) of the parameter(s) of interest may be determined (see step 340).

In order to reduce the number of simulations, the cell sizes may be chosen to have a large ratio of cell size to the size of IDC. In addition, certain cell combinations may be prohibited to reduce the search space. For example, a 1-tile VP to 2-tile VP may be excluded.

Note that the steps of the method 300 may be modified or deleted, and other steps may be added and not depart from the scope of the invention.

The method 300 may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes.

Exemplary computer readable signals, whether modulated using a carrier or not, are signals that a computer system hosting or running the computer program may be configured to access, including signals downloaded through the Internet or other networks. Concrete examples of the foregoing include distribution of the program(s) on a CD ROM or via Internet download. In a sense, the Internet itself, as an abstract entity, is a computer readable medium. The same is true of computer networks in general.

Figure 4:
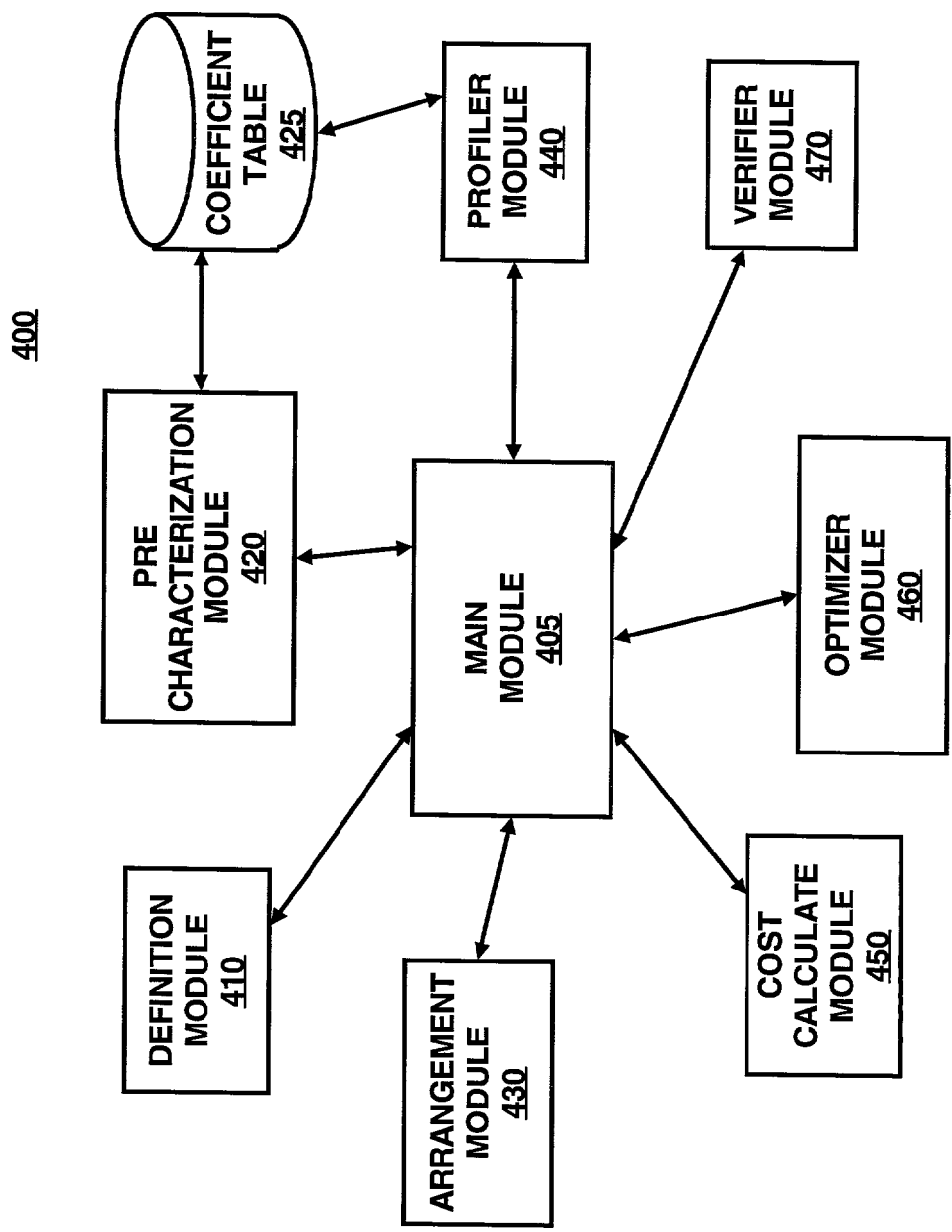
FIG. 4 illustrates a system used to design a layout of a datacenter according to an embodiment of the present invention.

In addition to software programs, the method 300 may also be implemented in a system. FIG. 4 illustrates an exemplary embodiment of a system 400 that may be used to design an IDC according to an embodiment of the present invention. As shown, the system 400 may include a main module 405, a definition module 410, an pre-characterization module 420, a coefficient table 425, an arrangement module 430, a profiler module 440, a cost calculate module 450, an optimizer module 460, and a verifier module 470.

The main module 405 may be configured to coordinate activities of the other modules of the system 405. The definition module 410 may be configured to communicate with the main module 405. The definition module 410 may also be configured to define the IDC as a collection of cells. For example, the definition module may specify cell(s), placement constraints, upgrade restraints, dependencies, and the like.

The pre-characterization module 420 may be configured to communicate with the main module 405. The pre-characterization module 420 may also be configured to pre-characterize the IDC and the cells. For example, pre-characterization module 420 may be configured to generate pre-characterization information, such as a look-up table (see Table II) and/or fitting formulas as discussed above. The pre-characterization information may be written to the coefficient table 425.

Figure 5:
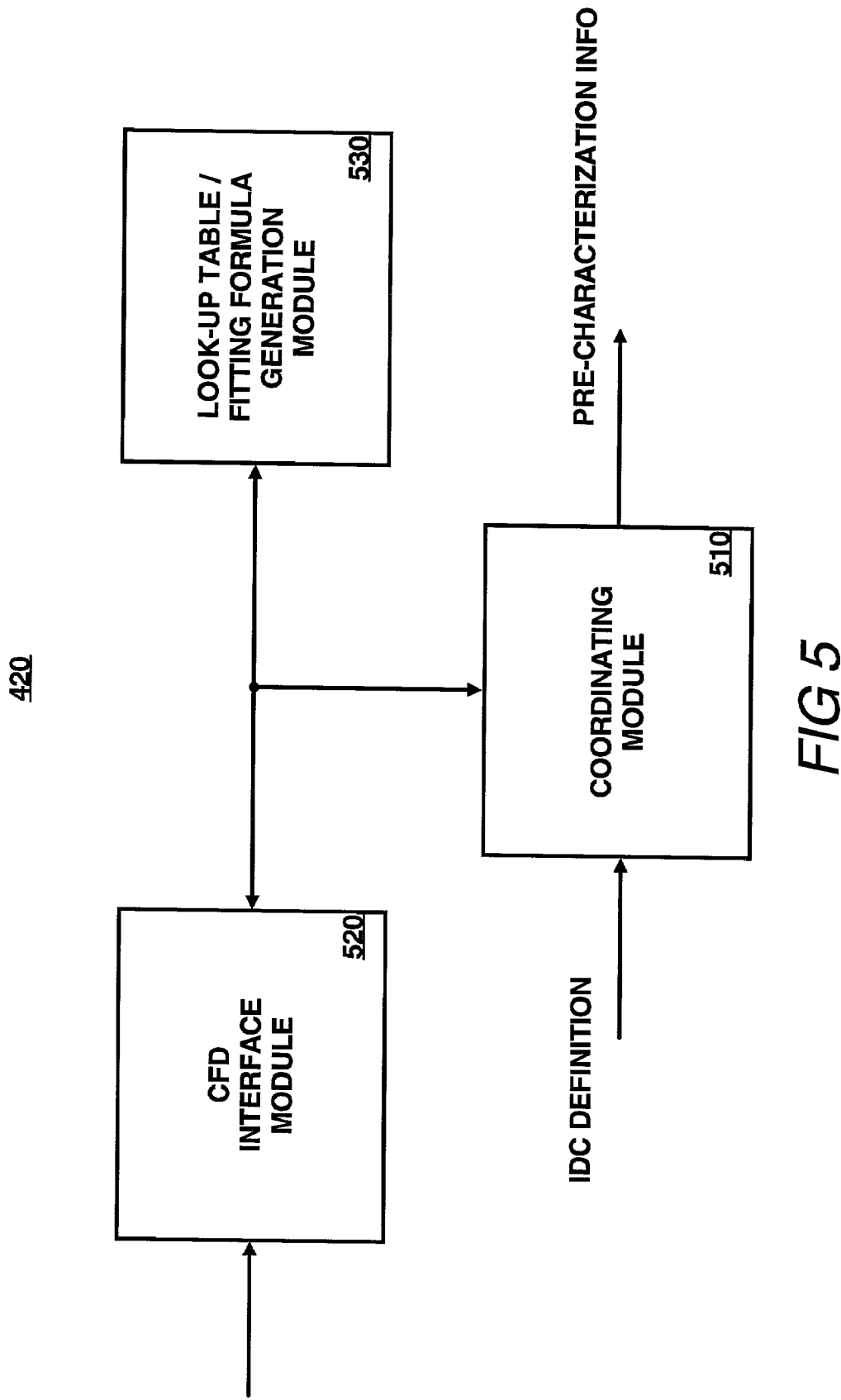
FIG. 5 illustrates an exemplary pre-characterization module according to an embodiment of the present invention.

FIG. 5 illustrates an exemplary embodiment of the pre-characterization module 420 shown in FIG. 4. As shown in FIG. 5, the pre-characterization module 420 may include a coordinating module 510 configured to coordinate the activities of the pre-characterization module 420. The coordinating module 510 may receive inputs from the definition module 410 (not shown in FIG. 5) and output pre-characterization information for the parameter(s) of interest to the coefficient table 425. The coordinating module 510 may also be configured to extract the impacts of neighboring cells, as well as impacts of the variables of the cells. The pre-characterization module 420 may also include a CFD interface module 520 configured to interface with a source of CFD data. The pre-characterization module 420 may further include a look-up table/fitting formula generation module 530 configured to generate the look-up table of coefficients and/or fitting formulas for the parameter(s) of interest.

Referring back to FIG. 4, the arrangement module 430 may be configured to determine an arrangement of the cells within the IDC within the constraints defined by the definition module 410. The arrangement module 430 may also be configured to arrange the cells based on search results of an optimizer module 460 (described hereinbelow).

The profiler module 440 may be configured to communicate with the main module 405. The profiler module 440 may also be configured to determine a profile for one or more parameters of interest, such as maximum temperature, for each cell based on the cell arrangement and the pre-characterization information, i.e. the table of coefficients, in the coefficient table 425. In one embodiment, the profiler module may be configured to perform the multiple regression analysis as discussed above (see equation 1).

The cost calculate module 450 may be configured to communicate with the main module 405. The cost calculate module 450 may also be configured to calculate costs of the layout design based on the profile determined by the profiler module 440.

The optimizer module 460 may be configured to communicate with the main module 405. The optimizer module 460 may also be configured to optimize solutions based on the costs calculated by the cost calculate module 450. In one embodiment, the optimizer module 460 may be capable of implementing genetic algorithms to reach "best-thus-far" solutions. The optimizer module 460 may be capable of implementing other search methods. The arrangement module 420 may use the results of the optimizer module 460 to determine a different arrangement of cells so that the IDC layout design process may be iterated to find more optimal solutions.

The verifier module 470 may be configured to communicate with the main module 405. The verifier module 470 may also be configured to verify the layout design arranged by the arrangement module 430 and profiled by the profiler module 440. As noted before, CFD simulation may be performed to verify the IDC design.

While the invention has been described with reference to the exemplary embodiments thereof, those skilled in the art will be able to make various modifications to the described embodiments of the invention without departing from the true spirit and scope of the invention.

The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method of using a computer processor to design a physical layout for an Internet Datacenter (IDC) cooling, wherein the IDC comprises a plurality of components, said method comprising:
   modeling, in the computer, the components of the IDC as a collection of cells;
   assigning one or more characteristics to each of the cells;
   assigning one or more constraints to each of the cells;
   determining an arrangement of the cells within the IDC;
   determining a profile for one or more parameters of interest for each cell; and
   using the computer processor to design a physical layout of the IDC cooling based on the determined profile, to thereby model conditions within the IDC to stay within the determined profile.

2. The method of claim 1, wherein the parameters of interest of a cell include one or more of a maximum temperature, noise, electromagnetic interference, cost, and air flow rate.

3. The method of claim 1, wherein the step of modeling the IDC includes modeling each of the cells as one of a global and a local type of cell.

4. The method of claim 1, wherein:
   the one or more characteristics include one or more of a server type, vent tile pitch, orientation, ceiling plenum, floor plenum, and air conditioning; and
   the one or more constraints include one or more of placement constraints, upgrade restraints, and dependencies.

5. The method of claim 1, wherein the step of modeling components includes sizing the cells such that interaction between local cells is negligible in a simulation.

6. The method of claim 1, further comprising:
   generating a look-up table of coefficients of the one or more parameters of interest for each cell; and
   generating a fitting formula of coefficients of the one or more parameters of interest for each cell.

7. The method of claim 6, further comprising using computational flow dynamics to generate one or more of the look-up table and the fitting formula.

8. The method of claim 6, wherein the step of determining the profile for one or more parameters of interest for each cell includes determining one or more values corresponding to each of the one or more parameters of interest for each cell.

9. The method of claim 8, wherein the one or more values of the parameters of interest are determined for each cell based on one or more of:
   the cell arrangement;
   the look-up table of coefficients;
   the fitting formula of coefficients; and
   the characteristics of the cell.

10. The method of claim 9, wherein the one or more characteristics include at least one of a server type, vent tile pitch, orientation, ceiling plenum, floor plenum, and air conditioning.

11. The method of claim 9, further comprising: using a multiple regression equation used to determine the one or more values of the parameters of interest for each cell.

12. The method of claim 1, further comprising one or more of:
   calculating costs based on the profiles of one or more parameters of interest of the cells; and
   verifying a solution from the step of determining the profile.

13. The method of claim 12, wherein the calculated cost is measured in one or more of money, power consumption, server density, usability, and efficiency.

14. The method of claim 12, wherein the step of verifying the solution includes using computational flow dynamics simulation.

15. The method of claim 1, further including iterating one or more times through the steps of:
   calculating costs based on the profiles of one or more parameters of interest of the cells;
   optimizing the cell arrangement based on the results of the calculating step;
   determining the arrangement of cells based on the optimizing step; and
   determining the profile for the one or more parameters of interest.

16. The method of claim 15, wherein the step of optimizing the cell arrangement includes using at least one of genetic algorithm, simulated annealing algorithm, threshold acceptance algorithm, branch and bound algorithm, and gradient-descent algorithm to optimize the cell arrangement.

17. A computerized system to design a physical layout for Internet Datacenter (IDC) cooling, wherein the IDC comprises a plurality of components, said system comprising:
   a definition module stored in the computerized system configured to define model the components of the IDC as a collection of cells and to assign one or more constraints to each of the cells, wherein the modeling and the one or more constraints are stored as data on the computer;
   a pre-characterization module configured to generate pre-characterization information of the cells of the IDC to a coefficient table stored as data on the computer;
   an arrangement module configured to determine an arrangement of the cells within the IDC;
   a profiler module configured to determine a profile for one or more parameters of interest for each cell based on the pre-characterization information from the coefficient table; and
   a main module configured to design, on the computerized system, a physical layout of the IDC cooling based on the determined profile, to thereby model conditions within the IDC to stay within the determined profile.

18. The system of claim 17, wherein the parameters of interest of a cell include one or more of a maximum temperature, noise, electromagnetic interference, cost, and air flow rate.

19. The system of claim 17, wherein the definition module is further configured to:
   model components each of the cells as one of a global and a local type of cell.

20. The system of claim 17, wherein:
   the one or more characteristics include one or more of a server type, vent tile pitch, orientation, ceiling plenum, floor plenum, and air conditioning; and
   the constraints include one or more of placement constraints, upgrade restraints, and dependencies.

21. The system of claim 17, wherein the definition module is further configured to model the sizes of the cells such that interaction between local cells is negligible in a simulation.

22. The system of claim 17, wherein the pre-characterization module comprises:

a computational flow dynamics (CFD) interface module configured to interface with an external source of CFD data;

a look-up table/fitting formulation generation module configured to generate one or more of a look-up table of coefficients and a fitting formula of the one or more parameters of interest for each cell; and a coordinator module configured to coordinate activities of the CFD interface module and the look-up table/fitting formula generator module and to write the one or more of the look-up table of coefficients and the fitting formula of the one or more parameters to the coefficient table.

23. The system of claim 22, wherein the profiler module is further configured to determine one or more values corresponding to each of the one or more parameters of interest for each cell based on the pre-characterization information from the coefficient table.

24. The system of claim 23, wherein the one or more values of the parameters of interest are determined for each cell based on one or more of;

the cell arrangement;
the look-up table of coefficients;
the fitting formula of coefficients; and
one or more characteristics of the cell.

25. The system of claim 24, wherein the one or more characteristics include one or more of a server type, vent tile pitch, orientation, ceiling plenum, floor plenum, and air conditioning.

26. The system of claim 17, further comprising one or more of:

a cost calculate module for calculating costs based an the profiles of one or more parameters of interest of the cells; and a verifier module for verifying a solution from the profiler module.

27. The system of claim 26, wherein the cost calculate module is configured to calculate cost measured in one or more of money, power consumption, server density, usability, and efficiency.

28. The system of claim 26, wherein the verifier module is configured to use a computational flow dynamics simulation to verify the solution.

29. The system of claim 26, further comprising:

or optimizer module configured to optimize the solution based on results reached by the cost calculate module.

30. The system of claim 29, wherein the optimizer module utilizes at least one of a genetic algorithm, a simulated annealing algorithm, a threshold acceptance algorithm, a branch and bound algorithm, and a gradient-descent algorithm to optimize the solution.

31. The system of claim 29, wherein the arrangement module is further configured to arrange cells of the IDC based on results of the optimizer module.

32. A computerized system for designing a physical layout for Internet Datacenter (IDC) cooling, wherein the IDC comprises a plurality of components, said system comprising:

means to model, stored in the computerized system, the components of the IDC as a collection of cells;

means to pre-characterize assign one or more characteristics to each of the cells;

means to assign one or more constraints to each of the cells;

means to determine an arrangement of the cells within the IDC;

means to determine a profile for one or more parameters of interest for each cell; and means to design, on the computerized system, a physical layout of the IDC cooling based on the profile determined by the means to determine a profile, to thereby model conditions within the IDC to stay within the determined profile.

33. The system of claim 32, wherein the means to model includes:

means to model each of the cells as one of a global and a local type.

34. The system of claim 33, wherein the means to model further includes means to configure the sizes of the cells such that interaction between local cells is negligible in a simulation.

35. The system of claim 32, further comprising one or more of means to calculate costs based on the profiles of one or more parameters of interest of the cells; and means to verify a solution from the means to profile.

36. The system of claim 35, further comprising:

means to optimize the solution based on results reached by the means to calculate.

37. The system of claim 36, wherein the means to optimize utilizes at least one of genetic algorithm, simulated annealing algorithm, threshold acceptance algorithm, branch and bound algorithm, and gradient-descent algorithm to optimize the solution.

38. The system of claim 37, wherein the means to design is configured to arrange cells of the IDC based on the optimized solution of the means to optimize.

39. A computer readable storage medium on which is embedded one or more computer programs, said one or more computer programs implementing a method for using a computer processor to design a physical layout for an Internet Datacenter (IDC) cooling, wherein the IDC comprises a plurality of components, said one or more computer programs comprising a set of instructions for:

modeling, in the computer, die components of the IDC as a collection of cells;

assigning one or more characteristics to each of the cells;
determining an arrangement of the cells within the IDC;
determining a profile for one or more parameters of interest for each cell based upon the one or more characteristics and the arrangement of the cells;

assigning one or more constraints to each of the cells; and
using the computer processor to design a physical layout of to IDC cooling based on the assigned one or more constraints and the determined profile for each cell, such that IDC cooling is arranged to model conditions within the IDC to stay within the assigned one or more constraints and the determined profile of each cell.

* * * * *

UNITED STATES PATENT AND TRADEMARK OFFICE
CERTIFICATE OF CORRECTION

| | | |
|---|---|---|
| PATENT NO. | : 7,313,503 B2 | Page 1 of 1 |
| APPLICATION NO. | : 10/076635 | |
| DATED | : December 25, 2007 | |
| INVENTOR(S) | : Osamu Samuel Nakagawa et al. | |

It is certified that error appears in the above-identified patent and that said Letters Patent is hereby corrected as shown below:

In column 10, line 31, in Claim 17, delete "define" before "model".

In column 10, line 61, in Claim 20, insert -- one or more -- before "constraints".

In column 11, line 21, in Claim 24, after "of" delete ";" and insert -- : --, therefor.

In column 11, line 32, in Claim 26, after "based" delete "an" and insert -- on --, therefor.

In column 11, line 45, in Claim 29, delete "or" and insert -- an --, therefor.

In column 12, line 45, in Claim 39, delete "die" and insert -- the --, therefor.

In column 12, line 54, in Claim 39, after "of" delete "to" and insert -- the --, therefor.

Signed and Sealed this

Twenty-seventh Day of May, 2008

JON W. DUDAS
*Director of the United States Patent and Trademark Office*